June 6, 1933.  L. M. RUDOLPH  1,912,406
EDUCATIONAL DEVICE
Filed Dec. 1, 1931
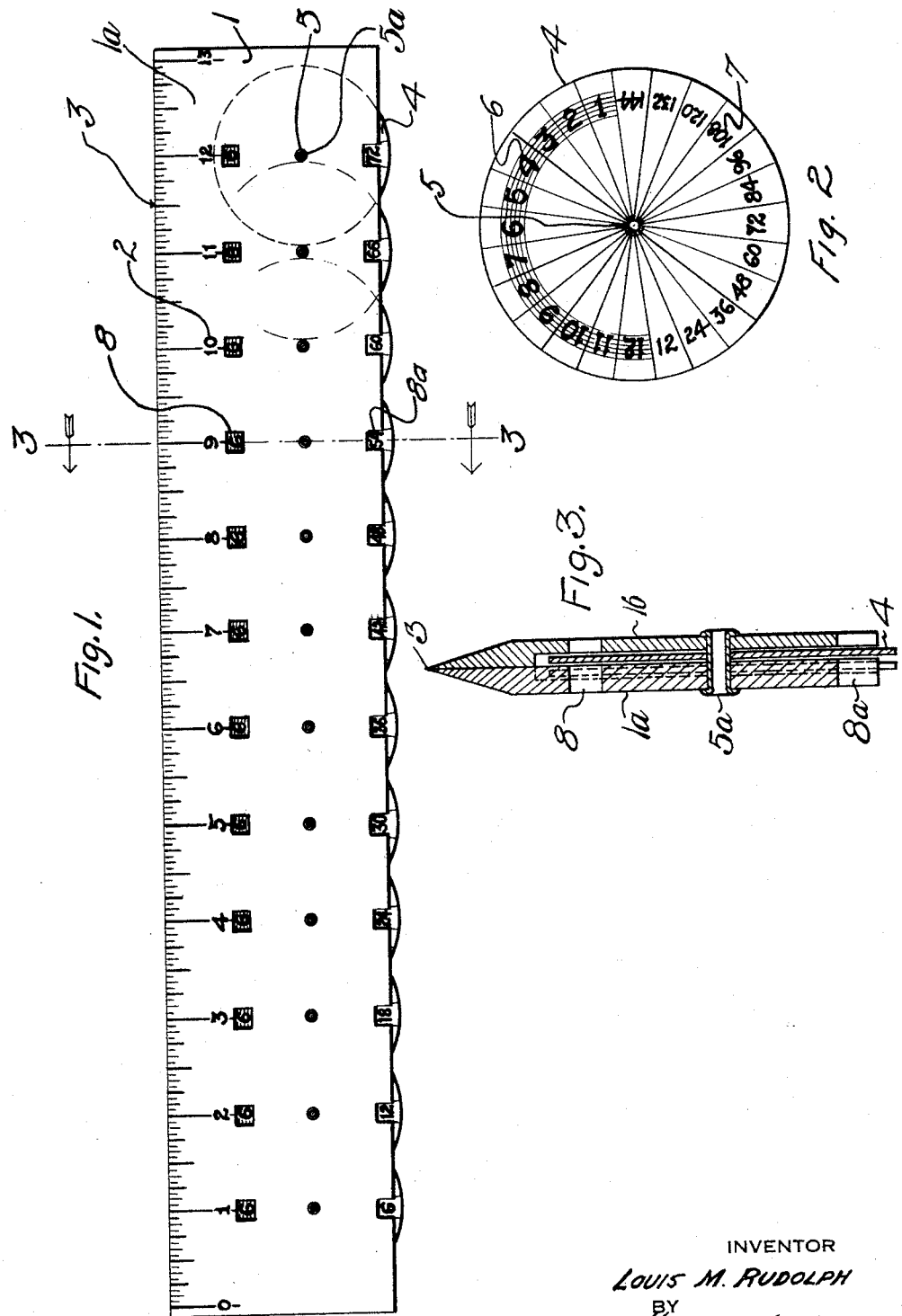
INVENTOR
LOUIS M. RUDOLPH
BY
ATTORNEYS.

Patented June 6, 1933

1,912,406

UNITED STATES PATENT OFFICE

LOUIS M. RUDOLPH, OF BROOKLYN, NEW YORK

EDUCATIONAL DEVICE

Application filed December 1, 1931. Serial No. 578,277.

This invention relates to an educational device for children, and more particularly to such a device adapted to instruct and aid a child in learning arithmetic, and at the same time in learning the use of the conventional measurement ruler.

It is of course well known from our own experience that arithmetic, generally speaking, is a puzzle to the ordinary child. Accordingly, it is usually rather difficult for the average child to grasp the basic fundamentals of this branch of study, such as the multiplication table, the principles of division and the like. In addition, the tedious hours spent, especially with the multiplication table, and the mysteries of division, contain little joy for the average youngster and tend to fill his mind with a hatred for arithmetic.

I have now constructed a device which greatly facilitates the study of arithmetic by the child, renders this study a pleasant pastime instead of a burdensome duty, and at the same time acquaints the child with and gives him an understanding of the use of the conventional measurement ruler. The arithmetical device and ruler are cooperatively combined with each other so that a study of the one necessarily involves a study of the other. Furthermore this combination provides a neat and compact arrangement for carrying and manipulating the arithmetical device.

It is accordingly an object of this invention to construct a combination ruler and an arithmetical device for teaching multiplication and division in such a way that a child will be taught the use of the ruler and at the same time the above branches of arithmetic.

Other and further objects of my invention will become apparent from the following description and appended claims.

Referring now to the drawing which discloses an illustrative embodiment of my invention, Fig. 1 is a front elevation of a ruler with means for teaching multiplication and division associated therewith;

Fig. 2 is an enlarged front elevation of one part of the means for teaching arithmetic; and Fig. 3 is a section on line 3—3 of Fig. 1.

On the drawing

The reference numeral 1 designates a ruler subdivided into inches and fractions of inches in the conventional manner. The ruler disclosed in Fig. 1 is shown as having a length of thirteen inches with the proper numerals, designated as 2, beneath each inch division. The ruler 1 is preferably composed of two sections of any suitable material, 1a and 1b, such as metal, wood, cardboard, celluloid or the like, secured together at their upper edges 3. If the ruler is made up of a flexible material like cardboard or the like, it can be formed by merely bending a sheet or strip of this material to provide a pair of sections hinged together along the line of the fold. By forming the ruler in this way, the two sections 1a and 1b form a protecting housing for the mathematical device described below. It is, however, to be understood that the ruler may be formed from a single ply of material. When made of cardboard, the cardboard may be impregnated with a substance to make it more wear resistant.

The mathematical device consists primarily of a plurality of discs 4, such as is shown in Fig. 2, rotatably mounted at their center points 5 by means of bearings 5a in the housing formed by sections 1a and 1b of the ruler. Each disc 4 is mounted so that its center point is in line with an inch marking 2 of the ruler, with a portion of one disc overlapping a portion of the adjacent discs.

Each of said discs 4 has two series of numbers located adjacent the outer edge of the disc, each series occupying about one-half the outer surface of the disc. The first series, indicated by the reference numeral 6, which is the same on each disc, runs counter-clockwise and ranges from 1 to 12, although it is apparent that the last figure of the series may be as high as desired, being limited entirely by the size of the disc diameter. This series, however, preferably ends at 12, as shown, being similar in this respect to the usual multiplication tables employed by children. The second series designated by reference numeral 7 runs clockwise and represents a range of numbers running from the product of 1 and the number designating the inch marking adjacent to which a particular disc is positioned to the product of twelves times said number. Obviously, this series, which, as stated, represents the products of a particular multiplier and a multiplicand ranging from 1 to 12, is different on each disc.

The outer section 1a of the ruler 1 has a slot 8 directly below each inch marking of the ruler through which may be viewed any number of first series 6 on the disc positioned adjacent said marking. Cut out portions 8a are also provided in said section 1a adjacent the lower edge of said section and in line with slots 8. Through each cut out portion 8a will be viewed the product of the number representing the inch marking adjacent to which the disc in question is positioned, with a number of the first series on the disc exposed through a slot 8. Fig. 1 of the drawing discloses the numeral 6, of series 6, exposed through each slot 8 and the product of the numeral 6, with each number designating an inch marking on the ruler, exposed through the slots 8a.

To prevent a child in operating the discs from becoming confused with the numbers on the discs representing products, series 7, and those representing multiplicands, series 6, it is advisable to make the two series of numbers in different colors, that is, the products may be shown in red and the multiplicands in black, although, of course, any two dissimilar distinguishing colors may be employed.

The operation of this device is self-explanatory. If a child desires to multiply any given number up to twelve by a series of numbers ranging up to twelve, he merely selects a given number designating a certain inch marking on the ruler and rotates the disc adjacent said marking to expose the multiplicands in series 6, properly colored, successively through a slot 8. The products, series 7, will then automatically be shown through a slot 8a. At the same time, by virtue of the fact that the multiplier represents an inch marking of the ruler, the child will become cognizant of the principles of use of the ruler. Furthermore, by subdividing the ruler into fractions of inches the child, through repeated use of the device, will become to a certain extent familiar with this branch of arithmetic.

While I have explained the above device and its operation as applicable to the teaching of multiplication, it is of course apparent that it likewise automatically teaches division. When used for this purpose the numerals representing products, that is, series 7, become dividends, the multipliers, that is, the markings on the ruler designated 2, become the divisors, and the multiplicands, that is, the numbers of series 6, the quotients. In other words, the problems in this case are set up by the numbers exposed through openings 8a and the numbers indicating inch markings of the ruler and the results are viewed through slots 8.

It is of course to be understood that various modifications of the device disclosed above may be made without departing from the spirit of my invention. For instance, if desired, each disc 4 may have two other sets of numbers corresponding to series 6 and 7 on its rear face cooperating with inch markings on rear section 1b of the ruler, said markings running from 13 to 25, and slots in said rear section similar to slots 8 and 8a for exposing said series of numbers through said section 1b.

A further modification might entail the construction of a ruler of greater length than that disclosed in the drawing.

Moreover, if it is desired to employ as multiplicands, numbers, of a higher order than 12, another series of numbers similar to series 6, but ranging from 13 to that desired can be positioned on each disc 4 below series 6. A series of numbers representing the products of the numbers of this series with a number representing an inch division of the ruler could then be inserted on the disc above series 7. Slots would then be provided above and below slots 8 and 8a respectively for exposing the numbers of these additional series.

Furthermore, the disc under the inch division 1 could be positioned beneath the half or any other fraction of an inch to teach multiplication and division with the fraction selected. Or, other discs could be positioned beneath the various half or other inch fractions of the ruler to acquaint a child with the multiplication and division of such fractions.

In addition, it is not necessary to position the inch markings 2 and slots 8 and 8a directly in line, as disclosed in Fig. 1. An operative device could be provided by positioning the center point of a disc beneath the inch marking preceding or following that, the number of which is to be a multiplier, for the multiplicands on the disc. In such a case the series of slots 8 and 8a would be placed in horizontal alignment with the center points of the various discs. Various other positionings of the discs with relation to the inch markings and slots 8 and 8a could be provided without a material change of the invention disclosed.

It will thus be appreciated that I have provided a combination ruler and arithmetical device which forms a neat, compact apparatus and in which the parts are so coordinated as to give the child, not only a knowledge of multiplication and division, but also an understanding of the principles of use of a ruler in measuring.

What I desire to claim and secure by Letters Patent is:

1. An educational device comprising a ruler, a plurality of means movably mounted thereon, one being positioned adjacent each number designating an inch marking of the ruler, each of said means having two series of numbers on the face thereof, any number of one series being adapted to be read in connection with the number representing an inch marking adjacent to which a means is positioned to give a mathematical result contained in the second series, and means for isolating a number of the first series, and a number in the second series comprising the result of the arithmetical use of said first number with the number representing said inch marking.

2. An educational device comprising a ruler, a plurality of discs rotatably mounted beneath the front face thereof, each disc being positioned adjacent a number representing an inch marking on the ruler, each disc having two series of numbers thereon, any number of one series being adapted to be read in conjunction with a number representing the inch marking adjacent to which a disc is placed to provide a problem in multiplication or division, the result of which is given in the other series, said ruler having two series of openings through which are shown the numbers on the disc employed with the number representing said inch marking and the numbers representing the result of said problem.

3. An educational device comprising a ruler having a pair of sections joined at their upper edges to provide a housing therebetween, a plurality of discs rotatably mounted in said housing, each disc having its central point in line with a number representing an inch marking on the ruler, each disc having two series of numbers thereon, any number of one series being adapted to be read in conjunction with the number representing an inch marking adjacent to which a disc is placed to provide problems in multiplication or division, the results of which are given in the other series, said ruler having two series of openings through which are shown the numbers on the disc employed with said inch marking and numbers comprising the results of said problems, each series of numbers on a disc being differently colored to insure their presentation through the proper openings.

In testimony whereof I have hereunto set my hand.

LOUIS M. RUDOLPH.